Figure 1:
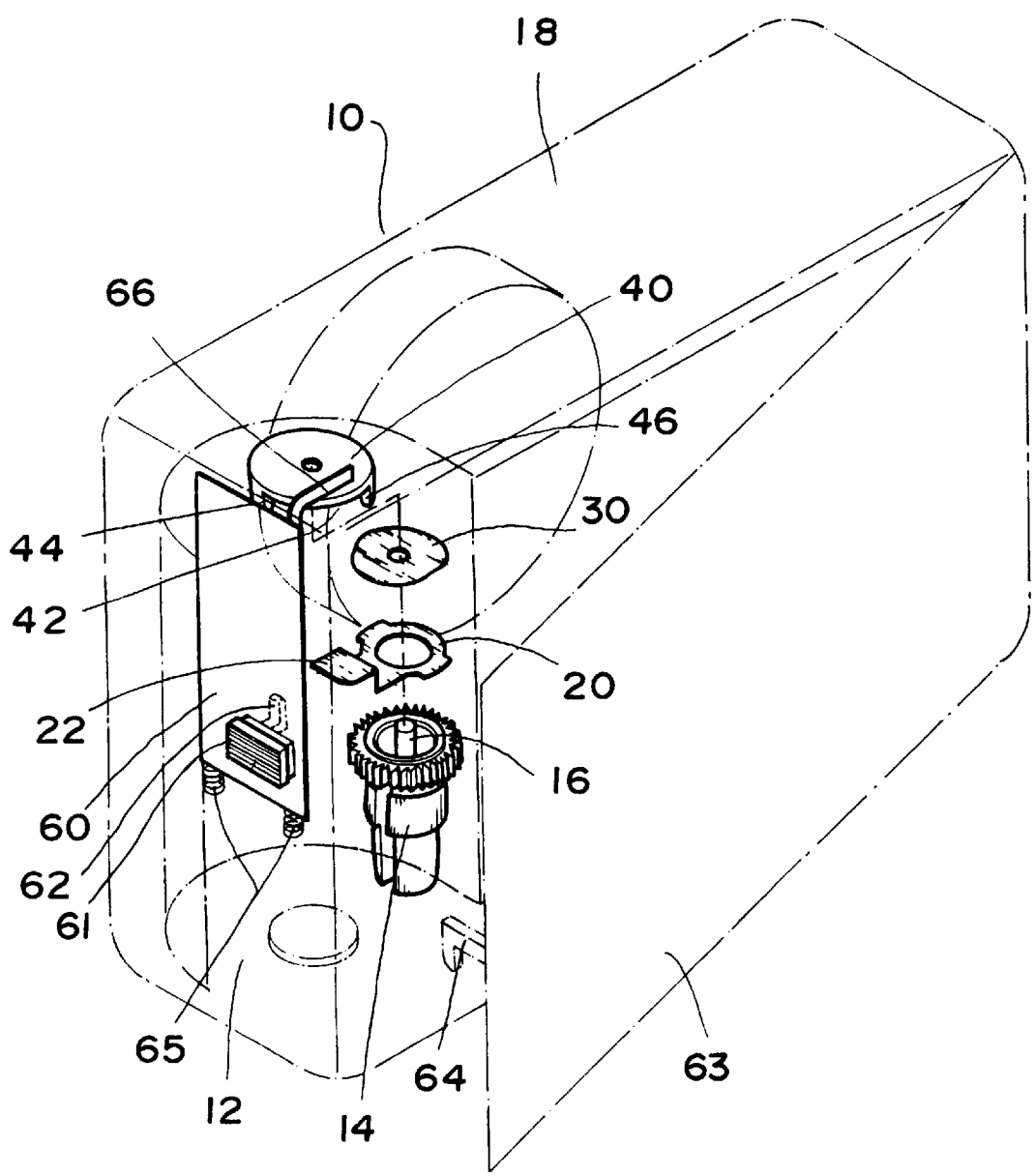

United States Patent [19]
Huang et al.

[11] Patent Number: 5,946,518
[45] Date of Patent: Aug. 31, 1999

[54] LOCKING MECHANISM FOR CAMERA BACK

[75] Inventors: Yeou-Fu Huang; Ta-hua Chiu, both of Wai Pu Hsiang, Taiwan

[73] Assignee: Sinpo Optical Co., Ltd., Taiwan

[21] Appl. No.: 08/906,956

[22] Filed: Aug. 6, 1997

[51] Int. Cl.[6] .................................................. G03B 17/02
[52] U.S. Cl. ............................................................ 396/536
[58] Field of Search ..................................... 396/535, 536, 396/537, 538

[56] References Cited

U.S. PATENT DOCUMENTS

| | | | |
|---|---|---|---|
| 3,096,699 | 7/1963 | Harvey et al. | 396/535 X |
| 4,887,114 | 12/1989 | Yamamoto et al. | 396/536 |
| 5,565,951 | 10/1996 | Tokui | 396/538 |

*Primary Examiner*—Howard B. Blankenship
*Attorney, Agent, or Firm*—Dougherty & Troxell

[57] ABSTRACT

A locking mechanism for the film-box cover of a camera is provided. Basically, the driven gear of the film receptacle of the camera interacts with a connecting catch which is rotatably mounted on a position binder: after the film is loaded into the receptacle and rolled out, the connecting catch will rotate an appropriate distance to prevent the opening/closing motion of the camera's film-box cover. This ensures that the box cover will not be accidentally opened, thus effectively preventing the exposure of the film which has already been used. Furthermore, when rewinding the film manually or by an automatic method after the roll of film has been used up for photography, the connecting catch will return to its original position to allow the film-box cover to regain its function for removal or reloading of the film.

3 Claims, 3 Drawing Sheets

LOCKING MECHANISM FOR CAMERA BACK

DESCRIPTION

This invention is related to a film-box cover for a camera. Specifically, it refers to a novel locking mechanism which protects the film which has already been used by guaranteeing that, during the process of photography, the film box will not be open unexpectedly.

As the film for the average camera has a specific number of takes, when the user has not finished using the film after a session of photograph, he will try his best to avoid opening the cover of the film box on his camera so as to prevent the sore disappointment of exposing the film which contains objects that have been photographed.

However, most of the latches on the film-box covers of various types of cameras in existence are open-type. Simply put, whenever the user performs any motion of pushing this latch, the cover of the film box will snap open as a result. In particular, this situation easily occurs when the user is not familiar with the mechanism of the camera or is not sure if there is any film loaded within the camera, or when children play with the camera. All these actions will result in irreparable exposure to the film within the camera which have been photographed. Quite possibly, many people have suffered from such a painful experience at one time or another.

Therefore, in view of the serious defects in the design and use of the film-box cover of the conventional cameras known, this inventor has actively sought to research and develop this invention based on his familiarity with cameras in general from many years of experience. It utilizes the driven gear of the film receptacle of the camera, which cooperates with a connecting catch which is rotatably mounted to a position binder, to ensure that when the film is loaded and rolled out in the camera, the connecting catch will prevent the opening/closing motion of the camera's film-box cover. The primary aim of this invention's design is to make sure that the box cover will not be opened accidentally, thus, effectively preventing the exposure of the film which has been photographed.

The following descriptions, complemented with illustrations, will aid in the in-depth understanding of the technical tricks and structural characteristics of this invention.

Simple explanation of illustration:

FIG. 1: Disassembly pictorial drawing of a better case application of this invention.

Figure 2:
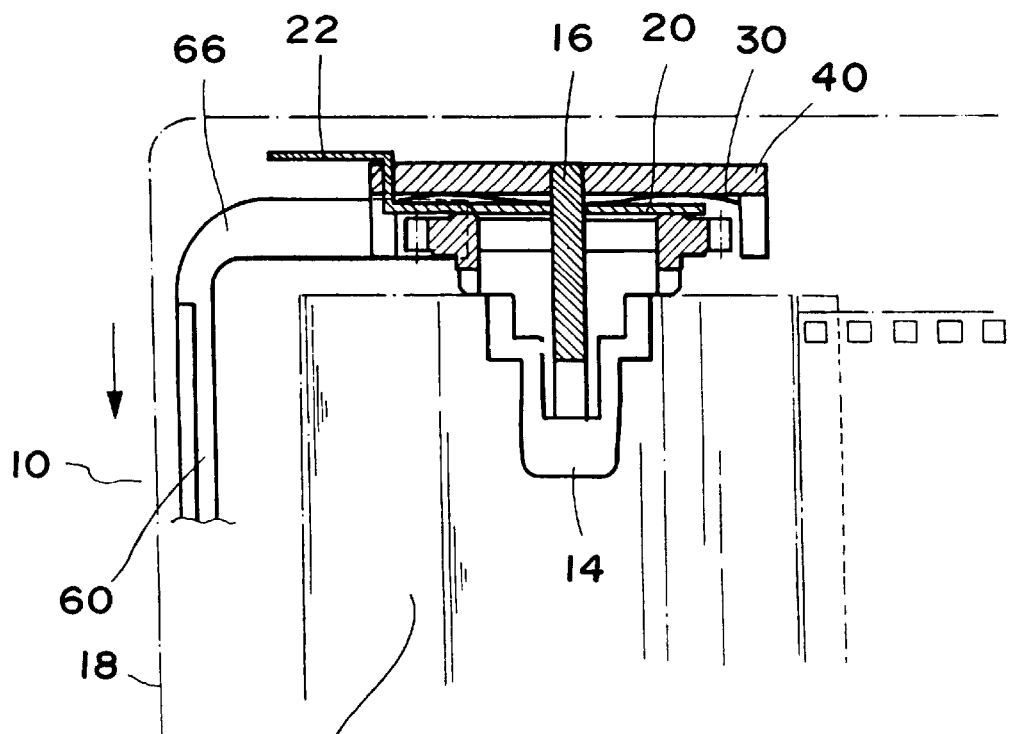

FIG. 2: Front-view position schematic drawing of a better case application of this invention after assembly.

Figure 3:
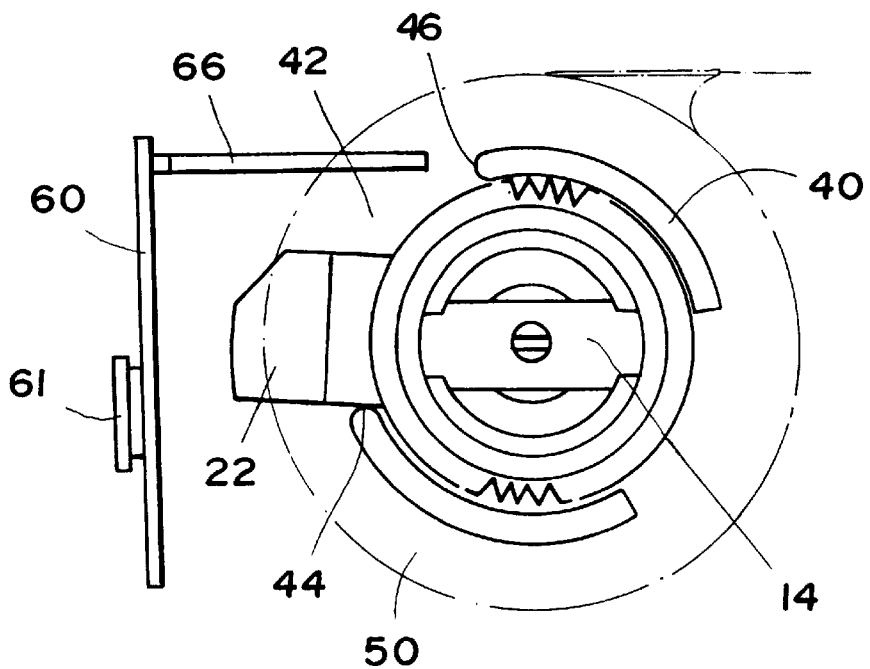

FIG. 3: Bottom-view position schematic drawing of FIG. 2.

Figure 4:
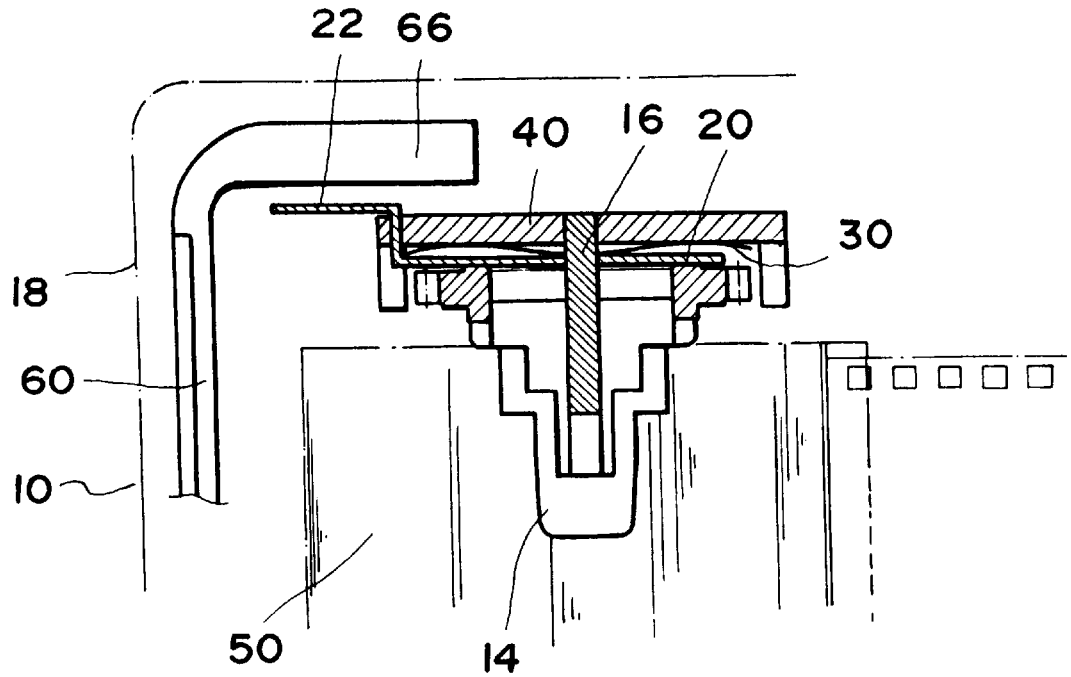

FIG. 4: Front-view motion schematic drawing of a better case application of this invention as described above.

Figure 5:
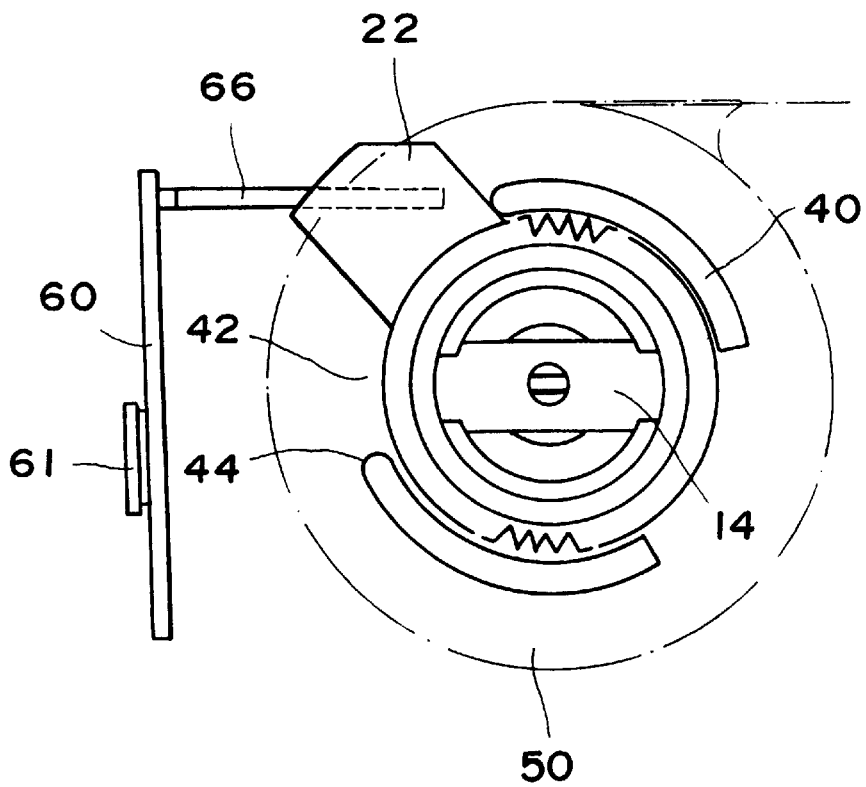

FIG. 5: Bottom-view motion schematic drawing of FIG. 4.

Firstly, please refer to FIGS. 1, 2 and 3. Basically, in this invention, the pivoting axle 16 on the driven gear 14 of the film receptacle 12 on the camera is connected to a connecting catch 20 and a supporting spring flap 30 via a pivot, and secured to a position binder 40. The purpose of the driven gear 14 is to allow for the placement of the film and its positioning. The connecting catch 20, supporting spring flap 30 and position binder 40 are assembled in sequence an the pivoting axle 16 according to each of their corresponding axle openings so that they are placed between the top of the driven gear 14 and the camera's 10 casing 18.

The connecting catch 20 is formed by a round flap with a stopper 22 extended from an appropriate position on it. The supporting spring flap 30 has a slightly wavy shape and it is perpetually pushed against the connecting catch 20 to provide the appropriate friction for the connecting catch 20 to rotate simultaneously with the driven gear 14. The position binder 40 is in the form of a cap and an opening 42 is appropriately positioned near its bottom. Therefore, when assembly is completed, the stopper 22 on the connecting catch 20 will appropriately extend from the opening 42 and stop the rotating action through the blocking portions 44, 46 on both sides of the opening 42.

The film-box cover's latch 60 on the camera 10 is a plate which is positioned within the side of the casing 18. It is provided with a push button 61 which is exposed on the exterior of the corresponding opening on the casing 18 so that the user may activate it by pushing. Therefore, when the push button 61 is pressed down, the box cover's latch 60 will be shifted downward as a result, causing its clasping edge 62 to break free from the corresponding clasping portion 64 on the film-box cover 63. This will then bring about the opening of the film-box cover 63. Naturally, a repositioning spring 65 is fixed on an appropriate position on the box-cover latch 60 so that the latch may automatically return to its original position. Therefore, in this invention, a bent rod 66 is fixed on one side of the upper end of the box cover's latch 60. It cooperates with the function of the stopper 22 on the connecting catch 20 to ensure that the film-box cover 63 is locked when the film 50 is rolled out.

When the camera 10 is not loaded with film 50 or when the film 50 is not rolled out yet, the position of the stopper 22 on the connecting catch 20 is within the film receptacle 12 as shown in FIG. 3 (hereafter this position will be referred to as the first position). At this point, the box cover's latch 60 may be freely pushed to open the film-box cover 63. Again, please refer to FIG. 4 and 5. When the user has the film 50 loaded, and manually or automatically rolled out the film, the driven gear 14 will be triggered to rotate toward a first direction. This movement will then result in the rotation of the connecting catch 20 on the common axle 16, causing the position of its stopper 22 to rotate to one side into a second position. The rotating motion will stop only when the side of the stopper 22 comes into contact with the corresponding blocking portion 46 of the opening 42 on the position binder 40. At this point, the stopper 22 will be positioned exactly below the bent rod 66 on the box cover's latch 60 (please refer to FIG. 4) such that the box cover's latch 60 will not be pushed further. The box cover will then be in a locked mode, accomplishing the anticipated protective function.

To open the film-box cover 63, simply roll up the film 50 manually or by automatic means. When the driven gear 14 and the connecting catch 20 (including stopper 22) rotate back to their first positions, the film-box cover can then be opened.

Finally, in order to ensure that the connecting catch 20 may rotate simultaneously with the driven gear 14, lines or prints may be etched onto a surface of the connecting catch 20 so as to increase its traction with the surface of the driven gear 14.

In view of the above description, the invention, "locking mechanism for the film-box cover of a camera", is not only unseen among similar products in the market and relevant periodicals/literature, it also has the practical value of being "novel" and "progressive". As it meets the prerequisites for new-model patent, it should be protected by the patent law. Therefore, patent application is made.

We claim:

1. A locking mechanism for a film-box cover of a camera, the camera having a casing with a film receptacle therein, the locking mechanism comprising:
 a pivoting axle which is mounted within the film receptacle on a first side of the casing of the camera;
 a driven gear rotatably mounted on the pivoting axle;
 a connecting catch formed by a round flap with a stopper extending therefrom, the connecting catch being disposed about the pivoting axle between the driven gear and the first side of the camera;
 a supporting spring flap in contact with the connecting catch which pushes the connecting catch into frictional engagement with the driven gear, the supporting spring flap being disposed about the pivoting axle between the connecting catch and the first side of the camera;
 a position binder non-rotatably mounted about the pivoting axle between the supporting spring flap and the first side of the camera, the position binder having an opening defined between two blocking portions which receives the stopper of the connecting catch;
 a film-box cover latch positioned within a second side of the casing of the camera, the second side being adjacent to the first side, the film-box cover latch being movable for unlatching the film box cover; and
 a bent rod fixed on the film-box cover latch within the casing of the camera;
 wherein rotation of the driven gear in a first direction causes the connecting catch to rotate, through frictional engagement therewith, from a first position with the stopper against one of the blocking portions of the position binder to a second position with the stopper against the other of the blocking portions, the first position of the connecting catch positioning the stopper to allow movement of the bent rod and unlatching of the film-box cover and the second position of the connecting catch positioning the stopper to prevent movement of the bent rod and unlatching of the film-box cover, so that the film box cover is locked.

2. A locking mechanism according to claim 1, wherein rotation of the driven gear in a second direction opposite the first direction causes the connecting catch to rotate, through frictional engagement therewith, from the second position to the first position so that the film-box cover is unlocked.

3. A locking mechanism according to claim 1, wherein the connecting catch includes an etched surface which is pushed into frictional engagement with the driven gear by the supporting spring flap.

* * * * *